United States Patent
Coffman

(10) Patent No.: US 9,604,717 B2
(45) Date of Patent: Mar. 28, 2017

(54) SYSTEMS AND METHODS FOR OPERATING FLIGHT CONTROL SURFACES

(71) Applicant: THE BOEING COMPANY, Chicago, IL (US)

(72) Inventor: Jeffrey C. Coffman, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 348 days.

(21) Appl. No.: 14/305,838

(22) Filed: Jun. 16, 2014

(65) Prior Publication Data
US 2016/0244152 A1   Aug. 25, 2016

(51) Int. Cl.
| | |
|---|---|
| B60N 2/00 | (2006.01) |
| G05D 1/02 | (2006.01) |
| B64C 13/16 | (2006.01) |
| B64C 13/28 | (2006.01) |
| B64C 13/44 | (2006.01) |
| B64C 9/00 | (2006.01) |
| B64C 13/50 | (2006.01) |
| F03G 1/00 | (2006.01) |

(52) U.S. Cl.
CPC ............... *B64C 13/16* (2013.01); *B64C 9/00* (2013.01); *B64C 13/28* (2013.01); *B64C 13/44* (2013.01); *B64C 13/50* (2013.01); *F03G 1/00* (2013.01)

(58) Field of Classification Search
CPC  B64C 13/16; B64C 9/00; B64C 13/50; B64C 13/28; F03G 1/00
USPC ........................................................... 701/3
See application file for complete search history.

(56) References Cited

U.S. PATENT DOCUMENTS

| | | |
|---|---|---|
| 3,084,776 A | 4/1963 | Rabinow |
| 3,189,302 A | 6/1965 | Bullinger |
| 4,603,594 A | 8/1986 | Grimm |
| 4,685,550 A * | 8/1987 | Metcalf ................ F16D 27/118 192/101 |
| 4,991,800 A | 2/1991 | Schwarz |

(Continued)

FOREIGN PATENT DOCUMENTS

| | | |
|---|---|---|
| EP | 1391621 | 2/2004 |
| WO | WO 87/02106 | 4/1987 |

OTHER PUBLICATIONS

Extended European search report for Application No. 15165612.1-17541, dated Nov. 2, 2015.

(Continued)

*Primary Examiner* — Anne M Antonucci
(74) *Attorney, Agent, or Firm* — Jay J. Hoette; The Small Patent Law Group, LLC

(57) ABSTRACT

Systems and methods for operating flight control surfaces are provided. One system includes a control device having a two piece shaft including a first shaft portion and a second shaft portion, a spline key detachably coupling the first shaft portion and the second shaft portion, and a crankshaft operatively coupling the two piece shaft and a flight control surface. The control device further includes a driving mechanism coupled to the spline key and operable to move the spline key to engage and disengage the first and second shaft portions, wherein the first and second shaft portions are disengaged when a failure to the flight control surface is detected, causing the second shaft portion to drive the flight control surface to a safe position.

20 Claims, 4 Drawing Sheets

(56) References Cited

U.S. PATENT DOCUMENTS

2007/0175694 A1    8/2007  Fort

OTHER PUBLICATIONS

MRichard D. Colgren, "The Design and Integration of Electromechanical Actuators within the U-25 Aircraft", American Institute of Aeronautics and Astronautics, Inc., 1998/.

* cited by examiner

SYSTEMS AND METHODS FOR OPERATING FLIGHT CONTROL SURFACES

BACKGROUND

The present disclosure relates generally to systems and methods for operating one or more flight control surfaces of an aircraft (e.g., aircraft flaps).

Aircraft may include different control surfaces, such as lift control surfaces or pitch control surfaces that facilitate controlling movement of the aircraft. Current primary control surfaces are driven by hydraulic actuators that handle hardover events or failures by additional redundancy or valving internal to the actuators. For example, a hardover failure may include the erroneous switching of a system to full command (i.e. full force). When this occurs in relation to the aircraft's elevator surfaces, control is lost and the surfaces are free to move, which if unchecked, can cause problems navigating the aircraft. A hardover failure of a hydraulically-powered aircraft control surface may result, for example, from a jam of the control valve spool or of the valve input arm.

Currently, for example, multiple surfaces, override valve spool sleeves and multiple single actuators may be employed to compensate for and to prevent hardover failures. Such approaches either fail to protect against valve arm jams or rely on all-active systems. Further, this additional redundancy or valving adds costs and complexity, as well as bulk, to the overall control system and, thus, the aircraft. For example, configuration cost and weight may increase, resulting in an increase in both fuel and maintenance costs.

SUMMARY

In accordance with one embodiment, a control device is provided that includes a two piece shaft including a first shaft portion and a second shaft portion, a spline key detachably coupling the first shaft portion and the second shaft portion, and a crankshaft operatively coupling the two piece shaft and a flight control surface. The control device further includes a driving mechanism coupled to the spline key and operable to move the spline key to engage and disengage the first and second shaft portions, wherein the first and second shaft portions are disengaged when a failure to the flight control surface is detected, causing the second shaft portion to drive the flight control surface to a safe position.

In accordance with another embodiment, an air vehicle is provided that includes a body portion, at least one flight control surface, and a control device coupled to the at least one flight control surface, wherein the control device includes a two piece shaft having first and second shaft portions coupled via a spline key. The air vehicle further includes a flight control computer coupled to the control device and configured to determine a failure of the at least one flight control device, wherein the flight control computer commands the control device to disengage the first shaft portion from the second shaft portion and the flight control surface, wherein the second shaft portion drives the flight control surface to a safe position when the second shaft portion is disengaged from the first shaft portion.

In accordance with yet another embodiment, a method for operating a flight control surface is provided. The method includes monitoring a flight control surface to detect a failure condition and sending a command to a two piece spline key coupled shaft control device to drive the flight control surface to a safe position when the failure condition is detected by disengaging shaft portions of the two piece spline key coupled shaft control device.

The features and functions discussed herein can be achieved independently in various embodiments or may be combined in yet other embodiments, further details of which can be seen with reference to the following description and drawings.

DETAILED DESCRIPTION

Figure 1:
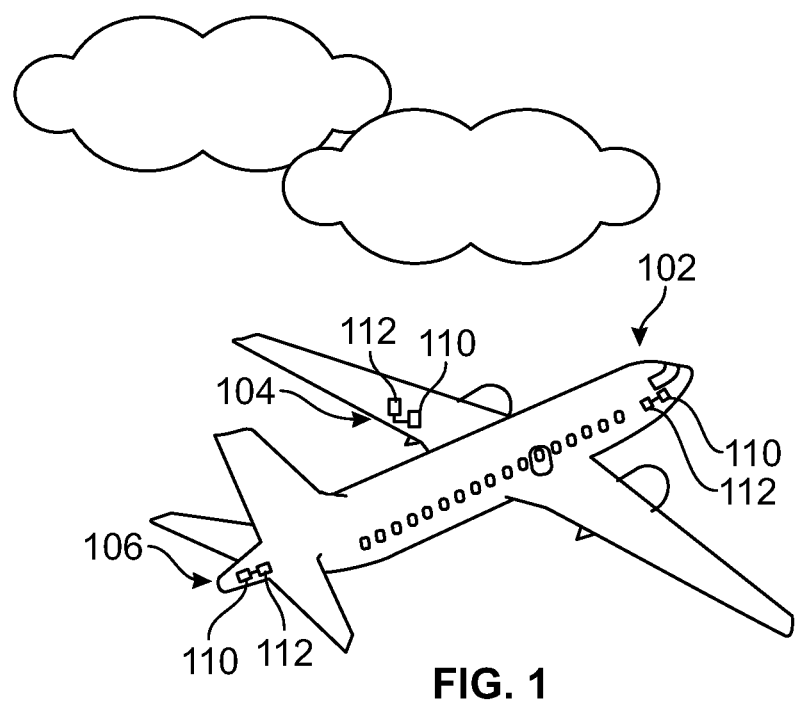
FIG. 1 is an illustration of an air vehicle having devices for driving primary flight control surfaces.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules, systems, or units shown in the attached figures may represent the hardware that operates based on software or hard-wired instructions, the software that directs hardware to perform the operations, or a combination thereof.

Various embodiments described and/or illustrated herein provide methods and systems for driving one or more primary flight control surfaces of an aircraft in the event of a hardover failure. For example, in the case of a primary flight control system hardover failure, the control surface loses control and drives to the fully deflected position. With the control surface driven and stuck in the fully deflected position, the controllability of the aircraft is affected. By practicing at least one embodiment, a secondary or backup method of driving the flight control surface(s) is provided to maintain the controllability of the aircraft.

For example, in some embodiments, a device is provided that allows the control surface to be driven back to the faired position (e.g., null position). As described in more detail herein, the control surface is driven back to the faired position by disconnecting an actuator component, such as an actuator output shaft, from the control surface and driving the control surface to a desired position, which in some embodiments is accomplished using a return spring. This driving of the control surface back to the faired position alleviates the hardover condition in various embodiments.

FIG. 1 illustrates an aircraft 102 that includes secondary or backup devices that drive the control surface(s) back to the faired position during a hardover condition. It should be noted that the term aircraft 102 may be used interchangeably with transport aircraft, airflight, airplane, plane, and the like.

In the illustrated embodiment, the aircraft 102 includes plural control surfaces such as, but is not limited to, flaperons or ailerons 104, an elevator 106, and the like. The direct lift control surfaces, the flaperons or ailerons 104, may be hinged control surfaces attached to a trailing edge of a wing of a fixed-wing aircraft. The flaperons or ailerons 104 may control a roll or bank (degree of rotation about a longitudinal axis) of the aircraft 102. In some embodiments, the flaperons 104 on each wing are lowered together to function much the same way as a dedicated set of flaps. In other embodiments, the ailerons 104 on each wing are actuated differently, one aileron downward while the other aileron is upward to control roll of the aircraft 102.

The elevator 106 is used to control a pitching motion of the aircraft 102, and are known as pitch control surfaces. The elevator 106 is located at a rear of the aircraft 102 and helps control a vertical movement of the aircraft 102. There may be two elevators 106 where each is attached to each side of a fuselage. In operation, the elevator 106 controls a position of a nose of the aircraft 102 and angle of attack of a wing.

As can be seen, a plurality of control devices 110 are provided in combination with one or more of the control surfaces, such as the flaperons 104 and the elevator 106. However, it should be noted that additional or fewer control devices 110 may be provided with different control surfaces, for example, based on the type of aircraft 102. The control devices 110 are configured to provide secondary operation to drive one or more of the control surfaces in the event of a hardover failure. It should be noted that although the various embodiments, including the control devices 110, are shown in combination with an aircraft 102, the control devices 110 may be used in combination with different types of aircraft 102, as well as in non-aircraft applications, such as to reduce the likelihood of a failure of an actuated component. The control devices may be used with other components of the aircraft 102, such as the landing gear.

In one embodiment, the control devices 110 are configured to operate as a retract mechanism wherein if the control surface moves to a maximum extent (e.g., plus or minus thirty degrees), thereby defining a hardover event, the control devices 110 are operable to retract the control surface(s) from the maximum extent. For example, a determination may be made that a failure condition has occurred within the hydraulics of the control surface(s) or an improper control command or signal is being sent (e.g., electronics failure), resulting in a hardover condition. When such a hardover condition is identified, such as if an actuator 112 of the control surface fails to respond or responds incorrectly to position the control surface(s), the corresponding control device 110, in particular the control device 110 connected to the failed actuator 112, performs a secondary or retract operation to drive the control surface(s) to a non-hardover position.

Figure 2:
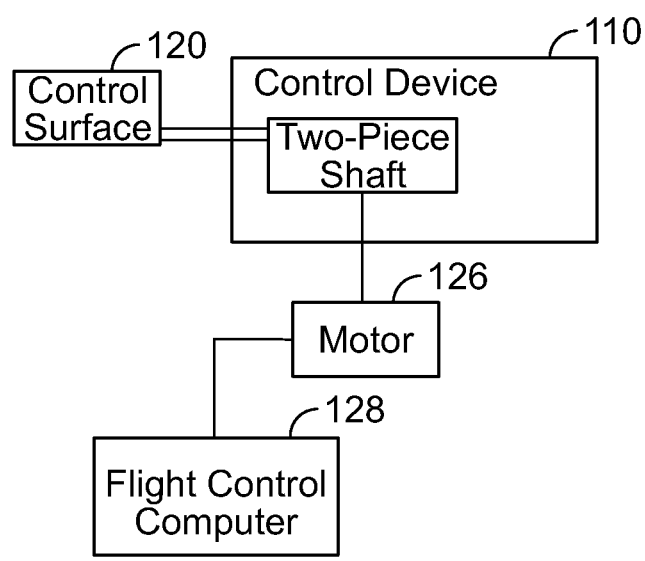
FIG. 2 is a block illustration of a control environment in accordance with an embodiment.

For example, as shown in FIG. 2, the control device 110 is operatively coupled to a control surface 120, which may be embodied, for example, as the flaperons 104 or the elevator 106 shown in FIG. 1. In the illustrated embodiment, the control device 110 includes a two-piece shaft 122 that is coupled to the control surface 120 via an output crankshaft 124. During normal operation, a motor 126 that is coupled to the two-piece shaft 122 drives the position of the control surface 120. For example, power from the motor 126 is transmitted via the two-piece shaft 122 to the output crankshaft 124 to drive the control surface 120 to different positions. In a normal operating mode, rotational movement of the two-piece shaft 122 is converted to translational movement by the output crankshaft 124 to move the control surface 120, such as to raise or lower the control surface 120.

In the normal operating mode, commands or control signals from the aircraft's control system are used to control the motor 126 to drive the control surface 120 to different positions. In the illustrated embodiment, the motor 126 is coupled to a flight control computer 128 that generates the command signals to control motor operation to thereby drive movement of the control surface 120. It should be noted that the command signals generated by the flight control computer 128 may be automatically generated, semi-automatically generated, or manually generated (e.g., based on pilot input).

In a non-normal operating mode, such as during a hardover condition, the control device 110 is configured to prevent the motor 126 from driving the control surface 120. Additionally, in such a condition, the control device 110 is configured to drive the control surface 120 from a position of the hardover condition to a position within a normal operating mode or into a non-hardover condition or safe position. For example, in one embodiment, the two-piece shaft 122 disengages the motor 126 from the output crankshaft 124 to prevent further movement of the control surface 120. Accordingly, any further commands to the motor 126 to move the control surface 120 do not cause movement of the control surface 120 as the power from the motor 126 can no longer be transmitted to the control surface 120. Additionally, in the non-normal operating mode, such as during a hardover condition, the control device 110 drives the control surface 120 out of the hardover condition, such as to a faired or null position to give the aircraft better controllability and/or drag when the two-piece shaft 122 disconnects the motor 126 from the output crankshaft 124.

Figure 3:
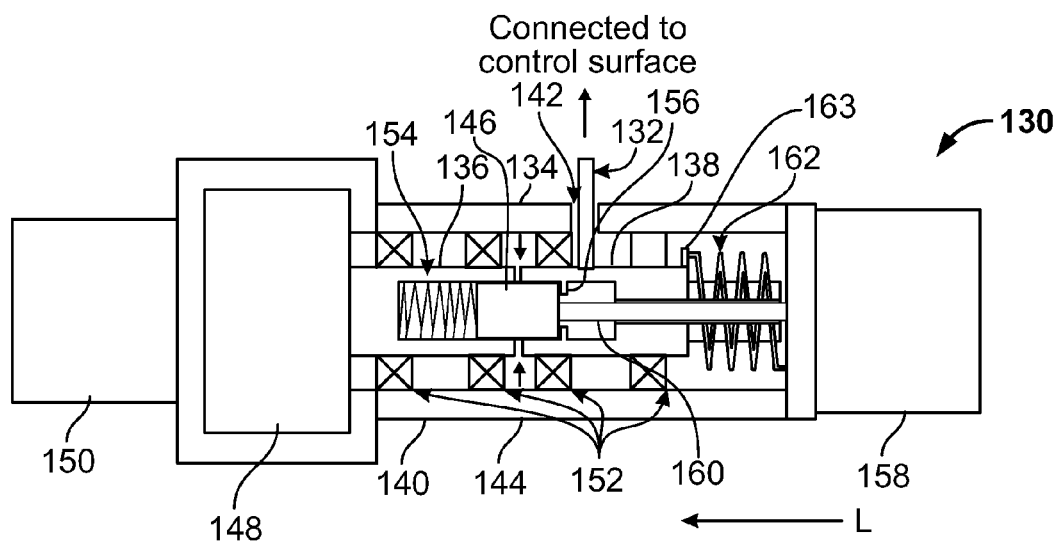
FIG. 3 is a schematic illustration of a control device in accordance with an embodiment in one mode of operation.

One embodiment, as illustrated in FIG. 3, includes a control device 130 configured to drive a control surface to a desired position to remove or alleviate a hardover condition (e.g., a control surface stuck in a fully deflected position, such as when the control surface loses control and drives to the fully deflected position). Thus, in operation, the control device 130 in various embodiments eliminates primary control surface hardover conditions. For example, the control device 130 may operate as a secondary method of driving the primary flight control surface, such as in the event of a hardover failure. The control device 130 may be embodied, for example, as the control device 110, shown in FIGS. 1 and 2. Using the control device 110 or 130 hydraulic actuators with additional redundancy or valving internal to the actuator are not used.

As can be seen in FIG. 3, the control device 130 includes a two-piece shaft (which may be embodied as the two piece shaft 122 shown in FIG. 2) that allows for engaging and disengaging with an output crank (which may be embodied as the output crankshaft 124 shown in FIG. 2). For example, the control device 130 is configured for coupling to a control surface via an output crank 132 that transmits power to drive the control surface. For example, the output crank 132 may be coupled to the control surface 120 (shown in FIG. 2) to drive the control surface 120 to a plurality of different positions to control flight of an aircraft. In one embodiment, the output crank 132 is rotatably operable to drive the control surface to a plurality of positions (e.g., drive the flaperons or ailerons 104, elevator 106 to different positions).

In the illustrated embodiment, the output crank 132 is coupled to a two piece shaft 134 formed from a first shaft portion 136 and a second shaft portion 138 located within a housing 140 (e.g., an actuator housing). The first and second shaft portions 136 and 138 may be axially aligned, for example, longitudinally within the housing 140 and perpendicular to the output crank 132 in this embodiment. However, it should be appreciated that other alignments or configurations may be provided. Additionally, although the output crank 132 is shown as coupled at a particular location of the second shaft portion 138, the output crank 132 may be coupled to a different location of the second shaft portion 138. In general, the output crank 132 is coupled to the second shaft portion 138 to allow the output crank 132 to extend outward from the housing 140, such as through an opening 142. It should be noted that the opening 142 may be differently sized and shaped, such as based on the size and shape of the output crank 132 and also may be sealed. Additionally, it should be noted that the output crank 132 in some embodiments is formed as part of (e.g., integrally formed with) the second shaft portion 138.

The first and second shaft portions 136 and 138 may be separated by a gap 144, which may be sized as desired or needed. In some embodiments, the first and second shaft portions 136 and 138 are aligned in abutting relationship during normal operation. The first and second shaft portions 136 and 138 are configured to operate together as a single shaft when engaged, or to operate separately as independent shafts when disengaged. For example, in the normal operating mode, the first and second shaft portions 136 and 138 are operable together to control the movement of the output crank 132 to drive the control surface. In a non-normal operating mode, for example, in a hardover failure mode of operation, the first and second shaft portions 136 and 138 are disengaged from each other and independently operable to control the output crank 132 and drive the control surface out of the hardover condition.

In the illustrated embodiment, the first and second shaft portions 136 and 138 are detachably coupled to each other via a spline key 146. For example, the spline key 146 in some embodiments engages with both the first and second shaft portions 136 and 138 to rotate the two piece shaft 134 during normal operation and drive the output crank 132. In one embodiment, the spline key 146 includes a drive shaft having splines (e.g., ridges or teeth, such as a 12 point spline) thereon that are complementary with (e.g., mesh with) portions of the first and second shaft portions 136 and 138 (e.g., grooves in the first and second shaft portions 136 and 138). In operation, rotation of the first shaft portion 136 when coupled with the second shaft portion 138 by the spline key 146 causes the rotating force or torque to be transferred from the first shaft portion 136 to the second shaft portion 138 to drive the output crank 132. However, as described in more detail herein, when the first and second shaft portions 136 and 138 are not engaged with the spline key 146, the first and second shaft portions 136 and 138 are capable of translating movement within the housing 140 (e.g., left and right movement as viewed in FIG. 3), but not rotation.

A gear train 148, which may be any type of gearing arrangement, is coupled to the first shaft portion 136 opposite the second shaft portion 138 in the illustrated embodiment. The gear train 148 may be any type of gearing arrangement, such as gears mounted on a frame so that the teeth of the gears engage each other and rotate together. The gear train 148 is located within the housing 140 in the illustrated embodiment. The gear train 148 is coupled to a motor 150 (which may be embodied as the motor 126 in FIG. 2), which is located outside the housing 140 in the illustrated embodiment. The motor 150 may be any type of motor that allows for actuation of the two piece shaft 134. For example, in operation, the motor 150, via the gear train 148, drives the first shaft portion 136 by turning or rotating the first shaft portion 136 within the housing 140. As can be seen, bearings 152 (e.g., ball bearings) are positioned within the housing 140 to facilitate rotation of the two piece shaft 134 within the housing 140. The number, positioning, and spacing of the bearings 152 may be varied as desired or needed.

In normal operation, with the first shaft portion 136 coupled to the second shaft portion 138 with the spline key 146, when the motor 150 operates to drive the gear train 148, the first shaft portion 136 rotates, which causes rotation of the second shaft portion 138 via the spline key 146. In normal operation, the spline key 146 is held in position relative to the first shaft portion 136 by a spring 154 (e.g., compression spring) coupled between the spline key 146 and the first shaft portion 136 (shown within the first shaft portion 136). In one embodiment, the spring 154 is normally biased to hold the spline key 146 in an engaged or locked position relative to the first and second shaft portions 136, 138. Thus, the two piece shaft 134 is maintained in alignment and position with the first shaft portion 136 operatively engaged with the second shaft portion 138 via the spline key 146. Thus, in this position, during normal operation, the first and second shaft portions 136 and 138 are aligned and coupled together by the spline key 146 to rotate together.

In the illustrated embodiment, the spring 154 causes the spline key 146 to engage and abut against a shoulder 156 of the second shaft portion 138 (illustrated within the second shaft portion 138). Thus, in normal operation, the spring 154 biases the spline key 146 against the shoulder 156 of the second shaft portion 138. In this position, as discussed in more detail herein, the first and second shaft portions 136 and 138 operate together, for example, rotate together to drive the output crank 132.

The control device 130 also includes a driving mechanism, illustrated as a solenoid 158, that is located outside the housing 140. The solenoid 158 interconnects with the spline key 146 via a plunger 160, illustrated as extending through the second shaft portion 138. Additionally, a torsion spring 162 is coupled to the second shaft portion 138, which may be positioned between an end of the housing 140 and a portion of the second shaft portion 138 (e.g., coupled to a protrusion 163, such as a tab, extending from the second shaft portion 138). In the illustrated embodiment, the torsion spring 162 is positioned about a portion of the length of the second shaft portion 138.

Figure 4:
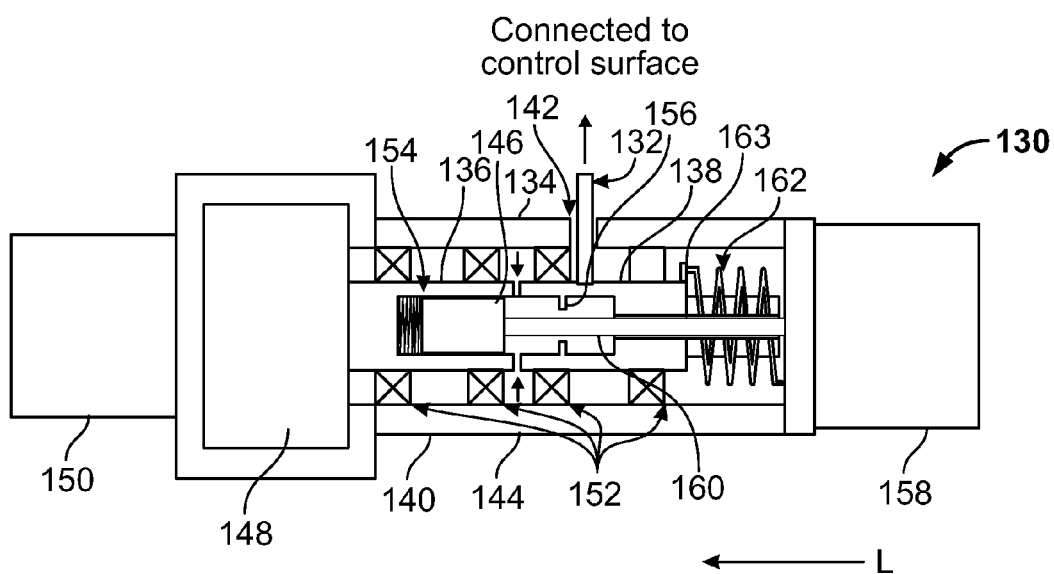
FIG. 4 is a schematic illustration of a control device in accordance with an embodiment in another mode of operation.

During a non-normal operation operating mode, for example, during a hardover failure condition, which may detected as described in more detail herein, the solenoid 158 is controlled to drive the plunger 160 longitudinally within the housing 140 (illustrated by the arrow L, from right to left as viewed in FIG. 3) such that the spline key 146 is translated within the housing 140. The plunger 160 is moved to translate the spline key 146 a distance D and against the biasing force of the spring 154 to move the spline key 146 away from the second shaft portion 138 to a position wherein the spline key 146 does not engage the second shaft portion 138, such as to the position shown in FIG. 4. For example, the entire spline key 146 is removed from coupling engagement with the second shaft portion 138 and only engages the first shaft portion 136. With the spline key 146 disengaged with the second shaft portion 138, the torsion spring 162 causes rotation of the second shaft portion 138 independent of the first shaft portion 136. In one embodiment, when in the disengaged position, the torsion spring 162 causes rotation of the second shaft portion 138 opposite to the rotation during the normal operating mode when extending the control surface. Accordingly, the output crank 132 is driven in the opposite direction to retract the control surface, such as to a faired position as described in more detail herein. In various embodiments, the torsion spring 162 in combination with the airstream returns the control surface to a position that removes the control surface from the airstream.

Once the control surface is retracted, the first and second shaft portions 136 and 138 may be maintained in a disengaged position or may be reengaged by moving the plunger 160 in an opposite direction to cause the spline key 146 to reengage with the second shaft portion 138. Thus, the first and second shaft portions 136 and 138 may be maintained in a disengaged position until, for example, maintenance is performed or proper operation of the control surface is returned.

In operation, the first and second shaft portions 136 and 138 may be engaged or disengaged to facilitate normal operation of the control surface or drive the control surface from a hardover failure position. For example, the two piece shaft 134 includes the first and second shaft portions 136 and 138 detachably engaged by the spline key 146. The spline key 146 is held in position with the spring 154 until an actuator failure occurs, for example, during a hardover failure condition. When there is actuator failure, which may be mechanical or electrical (such as improper control signaling), the solenoid 158 drives the spline key 146 against the spring 154 which disconnects or disengages the first and second shaft portions 136 and 138. Once the first and second shaft portions 136 and 138 are disconnected or disengaged, the torsion spring 162 drives the second shaft portion 138 to rotate the output crank 132 and drive the control surface to a safe position. It should be noted that the amount of movement caused by the torsion spring 160 may be determined based on the maximum extent of movement of the control surface (e.g., plus or minus thirty degrees). Thus, if a failure occurs, such as internal to the actuator (e.g., the control device 130) or if improper signals are being communicated, then a fast retract command signal may be sent to the solenoid 158 to initiate retract operation of the control surface as described herein.

Various embodiments disengage the control surface actuation in the event of a hardover condition (or a condition where the actuator is driven to the extreme end of travel and locked out from correcting). One or more embodiments provide for control of the actuator to a null or nominal position if hardover occurs.

Thus, a control surface may be driven back to a position where the control surface is no longer in the airstream by disconnecting the actuator output shaft from the control surface and driving the control surface to a desired position with a return spring, alleviating hardover condition (e.g., automatic flight control system failure that results in controls being driven to the extreme end of travel). Hardover can result in reduced controllability the aircraft. In various embodiments, the torsion spring 162 determines the null or fail safe position of the device. Loads induced on the control surface from the airstream will help to push the torsion spring 162 and control surface into position.

It should be noted that although various embodiments are described in connection with operation in combination with control surfaces, one or more embodiments may be implemented in connection with different applications. For example, one or more embodiments may be implemented in connection with landing gear/emergency gear release systems.

Figure 5:
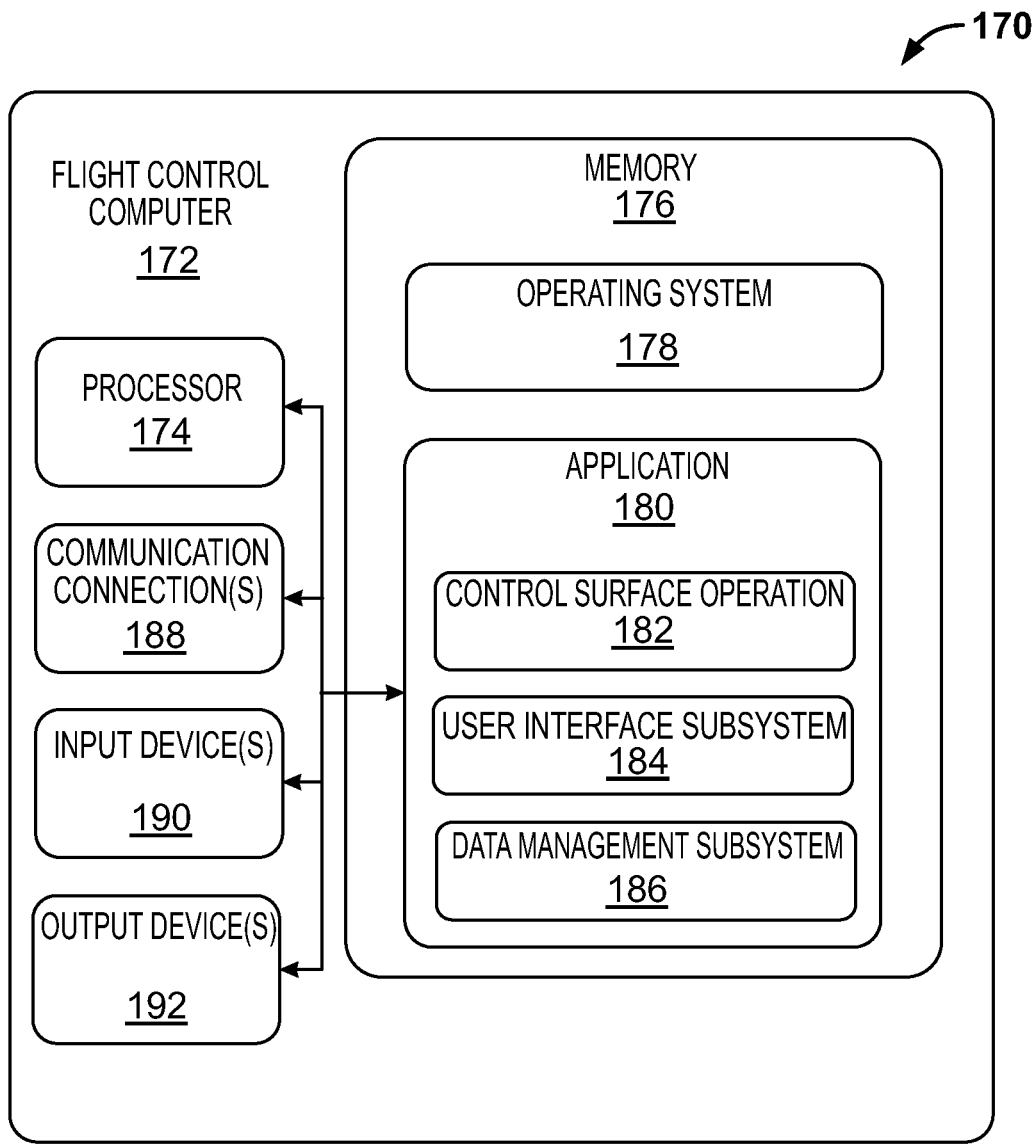
FIG. 5 is a block illustration of an operating environment in accordance with an embodiment.

The control devices described herein may be controlled by an operating environment 170 as shown in FIG. 5, which may be implemented in hardware, software, or a combination thereof. The operating environment 170 may be configured as any suitable flight control computer 172 capable of implementing and providing the control commands, such as for controlling the operation of the control device 110 or 130. In one embodiment, the flight control computer 172 includes at least one processor 174 and a memory 176. Depending on the configuration and type of flight control computer, the memory 176 may be volatile (such as RAM) and/or non-volatile (such as ROM, flash memory, etc.).

The memory 176 can store programs executed on the processor 174 and data generated during execution thereof. For example, the memory 176 may store any number of programs, data, including an operating system, one or more application programs, other program modules, and program data.

The memory 176 may include an operating system 178, one or more application programs 180 for implementing control surface operation 182, as well as various other data, programs, media, and the like. In one embodiment, the memory 176 includes the program for control surface operation 182, as well as for a user interface subsystem 184, and a data management subsystem 186.

The user interface subsystem 184 may present the user with a graphical user interface indicative of a current position of one or more control surfaces. The data management subsystem 186 in some embodiments manages storage of information, such as air data, navigation data, flight control data, control system data, control surface data, and the like, and may communicate with one or more local and/or remote databases.

The memory 176 may also include various computer-readable storage media. It should be understood that volatile memory may include media such as random access memory (RAM), non-volatile memory may include read only memory (ROM) and flash portion. The computing environment 170 may also include other removable/non-removable, volatile/non-volatile computer storage media such as a hard disk drive for reading from and writing to a non-removable, non-volatile magnetic media, a magnetic disk drive for reading from and writing to a removable, non-volatile magnetic disk, and an optical disk drive for reading from and/or writing to a removable, non-volatile optical disk such as a CD-ROM, DVD-ROM, or other optical media. The drives and associated computer-readable media can provide non-volatile storage of computer readable instructions, data, program modules, and other information for the flight control computer 172.

The flight control computer 172 may also contain communications connection(s) 188 that allow the flight control computer 172 to communicate with a database, and/or other devices on a network. Communications connection(s) 188 is an example of communication media. Communication media may embody computer readable instructions, data, program modules, or other information and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

The flight control computer 172 may also include, but is not limited to input device(s) 190, such as a keyboard, a mouse, a stylus-based device, a control stick, a control yoke, and the like. The flight control computer 172 may include output devices 192, such as a display screen, speakers, and the like. All of these devices may be provided as desired or needed, such as based on the particular aircraft.

Figure 6:
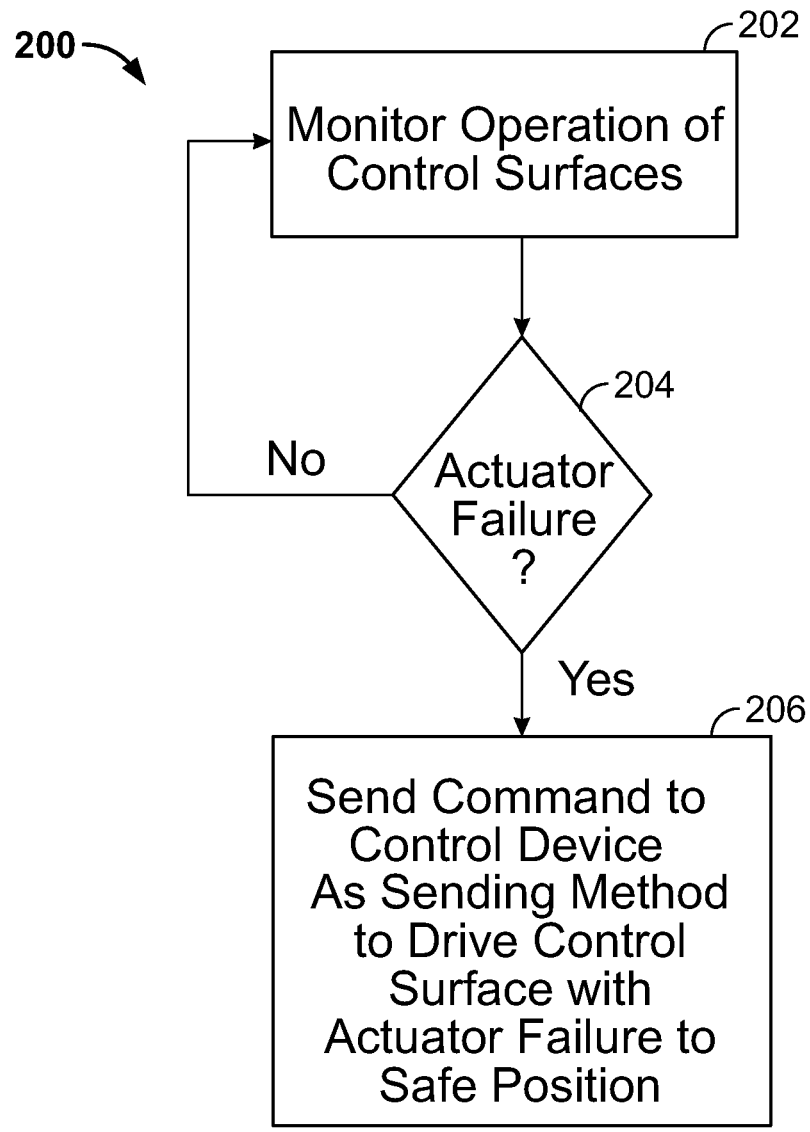
FIG. 6 is an illustration of operations for controlling flight control surfaces in accordance with an embodiment.

FIG. 6 is a flowchart of a method 200 for operating one or more control surfaces in accordance with various embodiments. In various embodiments, the method 200, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

The method 200 includes monitoring operation of one or more control surfaces at 202, such as primary flight control surfaces of an aircraft. In some embodiments, the one or more control surfaces are monitored to determine a current position and operating state of each. A determination is made at 204 as to whether there is any actuator failure associated with any one or more of the control surfaces. For example, as described in more detail herein, a determination is made as to whether a mechanical or electrical failure has occurred with the control surface, such as to cause a hardover condition. If a determination is made that actuator failure does not exist, then monitoring is continued at 202.

If a determination is made that actuator failure exists, then at 206 a command is sent to the control device as a secondary method to drive the control surface with actuator failure to a safe position (e.g., a faired position). For example, as described herein, instead of driving the primary motor of a control device, a secondary driver, such as a solenoid is actuated to cause retraction of the control surface.

Various embodiments may be used with different types of air vehicles, such as commercial aircraft. Thus, one or more embodiments may be implemented in connection with different types of aircraft.

It should be noted that the particular arrangement of components (e.g., the number, types, placement, or the like) of the illustrated embodiments may be modified in various alternate embodiments. In various embodiments, different numbers of a given module, system, or unit may be employed, a different type or types of a given module, system, or unit may be employed, a number of modules, systems, or units (or aspects thereof) may be combined, a given module, system, or unit may be divided into plural modules (or sub-modules), systems (or sub-systems) or units (or sub-units), a given module, system, or unit may be added, or a given module, system or unit may be omitted.

It also should be noted that the various embodiments may be implemented in hardware, software or a combination thereof. The various embodiments and/or components, for example, the modules, systems, or components and controllers therein, also may be implemented as part of one or more computers or processors. The computer or processor may include a computing device, an input device, a display unit, and an interface. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," "system", and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module", "system", or "computer."

The computer, module, system, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, system, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs, systems, or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, paragraph (f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A control device comprising:
   a two piece shaft including a first shaft portion and a second shaft portion, the first shaft portion driving the second shaft portion during normal operation;
   a spline key detachably coupling the first shaft portion and the second shaft portion;
   a crankshaft operatively coupling the second shaft portion of the two piece shaft and a flight control surface;
   a driving mechanism coupled to the spline key and operable to move the spline key to engage and disengage the first and second shaft portions, the first and second shaft portions disengaged when a failure to the flight control surface is detected, and
   a secondary driving device operably coupled to the second shaft portion causing the second shaft portion to drive the flight control surface to a safe position independent of operation of the first shaft portion after the first and second shaft portions are disengaged.

2. The control device of claim 1, wherein the secondary driving device is a torsion spring coupled to the second shaft portion to rotate the second shaft portion in a direction opposite to a direction for extending the flight control surface to retract the flight control surface.

3. The control device of claim 1, wherein the driving mechanism comprises a solenoid coupled to the spline key by a plunger, the plunger configured to disengage the spline key from the second shaft portion.

4. The control device of claim 1, further comprising a compression spring coupled to the first shaft portion and arranged to bias the spline key to engage the first and second shaft portions.

5. The control device of claim 1, wherein the crankshaft is coupled to the second shaft portion.

6. The control device of claim 1, further comprising a motor coupled to the first shaft portion to rotate the two piece shaft when the first and second shaft portions are engaged with each other.

7. The control device of claim 1, wherein the failure to the flight control surface comprises a hardover failure.

8. The control device of claim 1, further comprising a motor coupled to the two piece shaft, the motor operable to rotate the two piece shaft and the driving mechanism operable to translate the spline key relative to the two piece shaft.

9. The control device of claim 1, wherein the flight control surface comprises at least one of a flaperon, an aileron, or an elevator.

10. The control device of claim 1, wherein the safe position comprises a faired position of the flight control surface.

11. An air vehicle, comprising:
    a body portion;
    at least one flight control surface;
    a control device coupled to the at least one flight control surface, the control device including a two piece shaft having first and second shaft portions coupled via a spline key, the control device having a motor driving the first shaft portion and the second shaft portion when the spline key engages the second shaft portion, the control device having and a secondary driving device operably coupled to the second shaft portion to independently drive the second shaft portion; and
    a flight control computer coupled to the control device and configured to determine a failure of the at least one flight control device, the flight control computer commanding the control device to disengage the first shaft portion from the second shaft portion and the flight control surface, wherein the second shaft portion drives the flight control surface to a safe position when the second shaft portion is disengaged from the first shaft portion.

12. The air vehicle of claim 11, wherein the first and second shaft portions rotate in a first direction to extend the at least one flight control surface and the second shaft portion when disengaged from the first shaft portion rotating in a second direction opposite to the first direction.

13. The air vehicle of claim 11, wherein the at least one flight control surface comprises at least one of a flaperon, an aileron, or an elevator.

14. The air vehicle of claim 11, wherein the control device comprises an electrical actuator.

15. The air vehicle of claim 11, wherein the control device comprises a non-hydraulic actuator.

16. The air vehicle of claim 11, wherein the control device comprises a torsion spring to rotate the second shaft when disengaged from the first shaft portion.

17. The air vehicle of claim 11, wherein the control device comprises a compression spring to bias the spline key to engage the first and second shaft portions.

18. The air vehicle of claim 11, further comprising a solenoid disengaging the spline key from the second shaft portion.

19. A method for operating a flight control surface, the method comprising:
- monitoring a flight control surface to detect a failure condition; and
- sending a command to a two piece spline key coupled shaft control device to drive the flight control surface to a safe position when the failure condition is detected by disengaging shaft portions of the two piece spline key coupled shaft control device.

20. The method of claim 19, wherein monitoring the flight control surface comprises monitoring the flight control surface to detect a hardover failure as the failure condition and when detecting the hardover failure, sending the command to the two piece spline key coupled shaft control device to cause a solenoid to drive a plunger and spline key into a compression spring and wherein a torsion spring pulls a second shaft to a failed position with movement of the second shaft turning an output crank to return the flight control surface to a faired position.

\* \* \* \* \*